United States Patent
Mullins et al.

[11] Patent Number: 5,803,702
[45] Date of Patent: Sep. 8, 1998

[54] VISION INSPECTION SYSTEM FOR DOUBLE STACKED PACKS

[75] Inventors: Michael J. Mullins, Chesterfield; Barry S. Smith, Hopewell, both of Va.; Roy E. Vanderlinden, Frederick, Md.

[73] Assignee: Philip Morris Incorporated, New York, N.Y.

[21] Appl. No.: 746,402

[22] Filed: Nov. 8, 1996

[51] Int. Cl.⁶ .................................................. B65G 57/00
[52] U.S. Cl. .................. 414/788.7; 198/454; 414/797.2
[58] Field of Search .............. 414/788.7, 793.1, 414/794.4, 797.2, 797.6, 795; 209/939, 577, 587, 576; 198/454, 455, 623

[56] References Cited

U.S. PATENT DOCUMENTS

| | | | |
|---|---|---|---|
| 4,054,015 | 10/1977 | Rowell | 414/794.4 |
| 4,427,330 | 1/1984 | Carter | 414/797.2 |
| 4,851,902 | 7/1989 | Tezuka et al. | 209/577 |
| 4,934,687 | 6/1990 | Hayden et al. | 414/794.4 |
| 4,939,891 | 7/1990 | Podini | 414/794.4 |
| 4,962,843 | 10/1990 | Ouellette | 198/454 |
| 5,074,400 | 12/1991 | Focke et al. | 198/623 |
| 5,096,369 | 3/1992 | Ouellette | 414/788.7 |
| 5,311,999 | 5/1994 | Malow et al. | 209/939 |
| 5,365,596 | 11/1994 | Dante et al. | 382/8 |
| 5,412,926 | 5/1995 | Focke | 56/466 |
| 5,458,455 | 10/1995 | Oyama et al. | 209/577 |
| 5,460,271 | 10/1995 | Kenny et al. | 209/577 |
| 5,484,062 | 1/1996 | Rich | 209/587 |
| 5,537,670 | 7/1996 | Cox et al. | 382/219 |
| 5,645,392 | 7/1997 | Leichty et al. | 414/788.7 |
| 5,668,630 | 9/1997 | Bilodeau et al. | 209/587 |

FOREIGN PATENT DOCUMENTS

| | | | |
|---|---|---|---|
| 765266 | 8/1967 | Canada | 209/587 |
| 52-22272 | 2/1977 | Japan | 209/939 |
| 55-52825 | 4/1980 | Japan | 414/797.6 |

*Primary Examiner*—James W. Keenan
*Assistant Examiner*—Douglas Hess
*Attorney, Agent, or Firm*—James T. Moore; James E. Schardt; Charles E.B. Glenn

[57] ABSTRACT

An apparatus and process for the inspection, conveying, and optionally temporary storage of uniform packaged goods is described. The apparatus includes a singulating device which takes dual stacked goods and reduces the dual stack to a single line of goods, inspects the goods, returns the goods to a dual stack, and transports them to a cartoner. A preferred embodiment contains a temporary buffer for storage of the goods to compensate for manufacturing speed changes, supply/demand fluctuations, or excessive rejects.

16 Claims, 19 Drawing Sheets

230  232

VISION INSPECTION SYSTEM FOR DOUBLE STACKED PACKS

I. BACKGROUND OF THE INVENTION

A. Field of the Invention

The present invention relates to the field of systems for high-speed visual inspection of uniform packaged goods, including handling devices for the packaged goods and inspection apparatuses for the packaged goods.

B. Description of the Prior Art

Modern high speed equipment involved in the preparation of packaged consumer goods have made the production of vast quantities of products in short times feasible. For example, today's cigarette machines manufacture cigarettes at a speed of 14,000 cigarettes per minute. Several machines working in tandem can now reliably produce in excess of a billion units per day.

Cigarettes are conventionally packaged in packs of 20, although specialty consumer product packs of other goods with varying sizes may contain more or fewer items. On average, then, a single high speed machine can manufacture the equivalent of 700 packs of cigarettes per minute, over 10 packs per second. Other consumer goods are also packaged at high speeds as well (for example, individually wrapped cheese slices and the like).

Cigarette consumers tend to be very discriminating when it comes to cigarette packaging. Consumers of other uniformly packaged merchandise, such as foods, are also concerned about the integrity of the outer packaging in which the foodstuff or other consumer product is presented. Packages which contain aesthetic defects, such as printing defects, or packaging defects, such as misplaced foil or incorrectly sealed wrapper, will be rejected in the marketplace. The presence of defects in products is simply unacceptable to a company which strives to make a quality consumer product. Such defects also increase expense and waste.

Thus, inspection systems have evolved which are capable of visually inspecting the surfaces of the packaged goods. Such high speeds make manual visual inspection impossible, and camera systems for inspecting packs have been developed. For example, U.S. Pat. No. 5,412,926 describes a system for inspecting packaged goods and marking them for rejection if a defect in loading or packaging is discovered, and that reference is incorporated herein in its entirety.

In a conventional space-saving arrangement, packages are created and then stacked in a dual relationship for ease of processing and in preparation for final packaging for point-of-sale. Packages of raisins and cartons of cigarettes are examples of those items which are presented in dual stacked relation. Raisins are often packaged in packs of six cartons, three wide and two deep. Cigarettes are packaged in cartons of ten conventionally, five wide and two deep.

The packaging and cartoning machinery which has been developed for these purposes is quite expensive and not easily modified. Therefore, it would be valuable to be able to inspect all sides of these packaged materials which are presented in dual stacks before they are finally placed in the carton, sealed, and shipped to the local retailers or wholesalers.

II. SUMMARY OF THE INVENTION

The present invention contemplates providing an apparatus and method for inspecting a package which is presented as a stack of two deep. This is accomplished, e.g., by singulating the dual stack into a single stack arrangement, which may be traveling at a higher speed, such as at twice the speed of the original stack, then restacking the packs before presentation to the cartoner. In another preferred embodiment, the packs are separated by a series of conveyors such that their formerly hidden faces are exposed, e.g. by spreading apart the stacked items and alternating the passage of upper and lower packages before cameras.

III. BRIEF DESCRIPTION OF THE DRAWINGS

The invention is most easily understood with reference to the figures which follow.

IV. DETAILED DESCRIPTION

The present invention provides a final inspection; thus it is generally best suited for use between a final wrap or other preparation device and before the cartoner, although other locations may also be used. The final inspection thus performed minimizes the passage of any defects which may have occurred in the manufacturing process up to the final cartoning phase.

Figure 1:
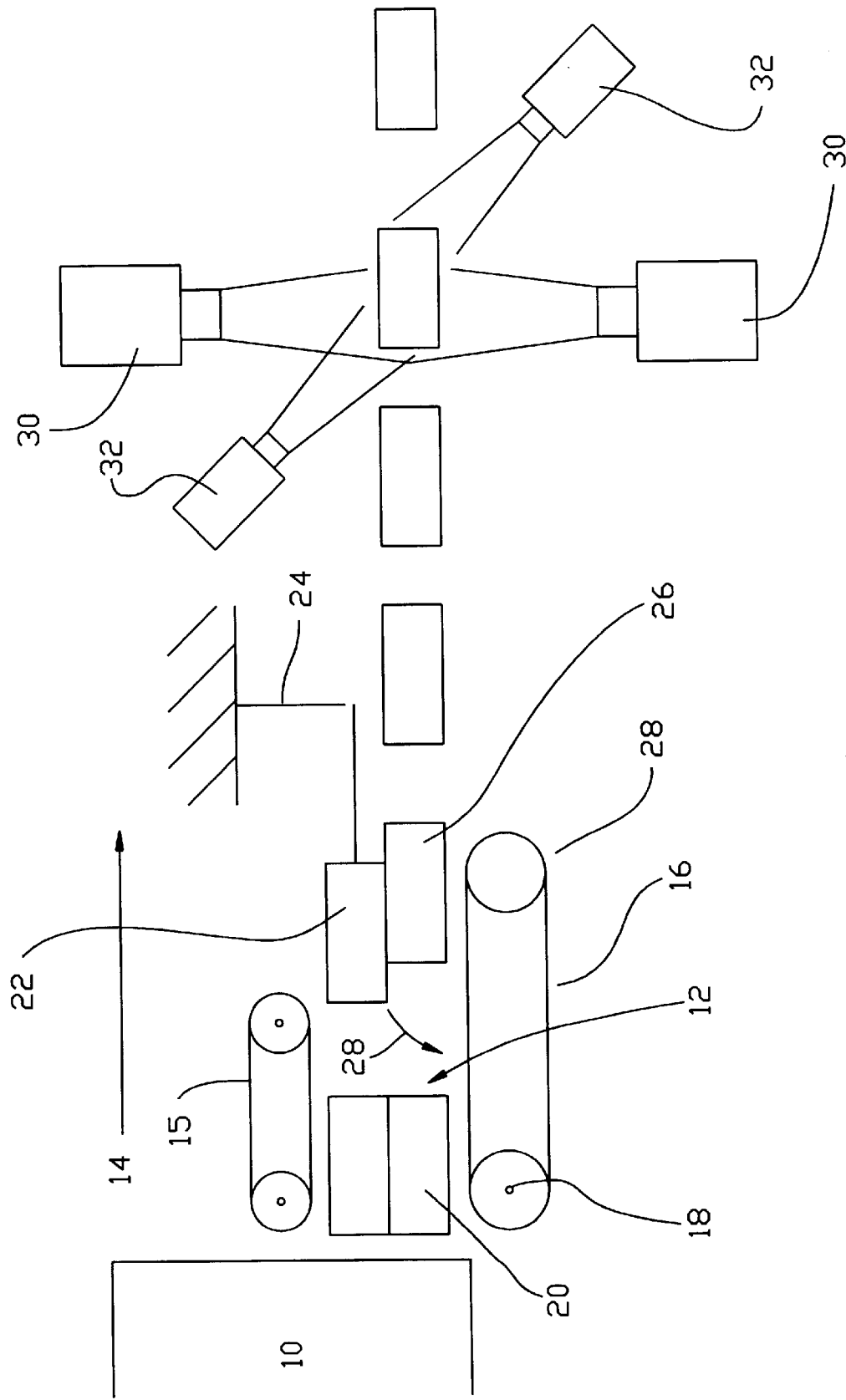
FIG. 1 is a partial side view of the inspection system illustrating its location after final pack preparation.

Turning now to FIG. 1, a brief overview of the process is seen. Packer or wrapper 10 performs the final manufacturing function on a carton, box, or other uniform container of goods. The packs then emerge in a dual stack arrangement 12 moving in the direction of arrow 14 as they are carried between upper belt 15 and lower belt 16 moved by rollers 18. The belts may be vacuum conveyors which hold the packs by virtue of negative pressure applied to the surface of the pack through apertures formed in the belt, or may be formed of a suitable rubberized material which frictionally engages the surface of the individual packs. In this arrangement the ends 20 of packs 12 are visible and are inspected by cameras (not shown for clarity of the figure).

The inspection cameras form an image of the pack end and determines whether that image is acceptable. An imaging system suitable for such a purpose is that described in U.S. Pat. No. 5,365,596, which disclosure is incorporated by reference in its entirety.

The top pack 22 of the leading stack 22 encounters stationary singulator 24 which is mounted to the machine frame. Singulator 24 may be a bar across the path of the upper pack 22, or may be a curved surface which gently bumps the upper pack. In any event, the singulator prevents upper pack 22 from passing forward. At this point in the travel of upper pack 22, preferably the upper belt is no longer in contact with the pack. Continued contact could cause surface damage to the wrapper of the pack due to the frictional engagement of the belt.

As lower leading pack 26 moves forward, the upper leading pack 22 is finally displaced to a point where it either falls under the influence of gravity to the surface of lower belt, or is pulled there by the action of negative pressure in a vacuum in the lower belt applied through apertures (not shown) in the general direction of arrow 28.

The singulated packs are picked up by a side conveyor system (not shown) which conveys them in a single fashion while gripping the previously inspected top or bottoms of the pack. Face and pack cameras 30 inspect the major faces of the pack, while side cameras 32 inspect the sides of the pack for a complete inspection of the surface of the pack.

Figure 2:
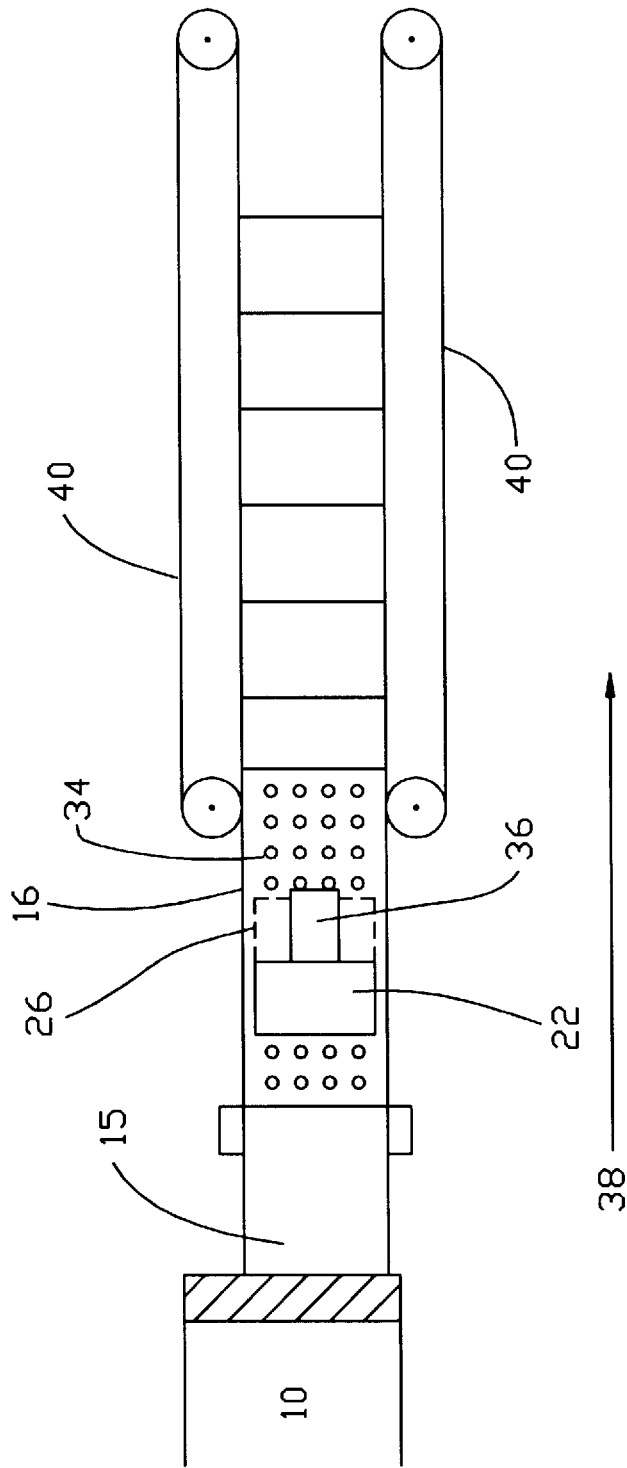
FIG. 2 is a top view of the inspection system of the invention as seen in FIG. 1.

FIG. 2 illustrates a partial top view of the singulator of FIG. 1. Wrapper 10 is visible as is the top portion of upper belt 15. Lower belt 16 is visible as are apertures 34 which optionally are present to draw air though them to hold the packs firmly against the belt. Upper pack 22 is being displaced by singulator 36. Lower leading pack 26, shown in dotted lines, is proceeding in the direction of arrow 38. The packs are carried by lower belt 16 until they are picked up by side belts 40 which grip the packs by their edges. The packs are inspected by cameras (not shown) while held in this orientation.

Figure 3:
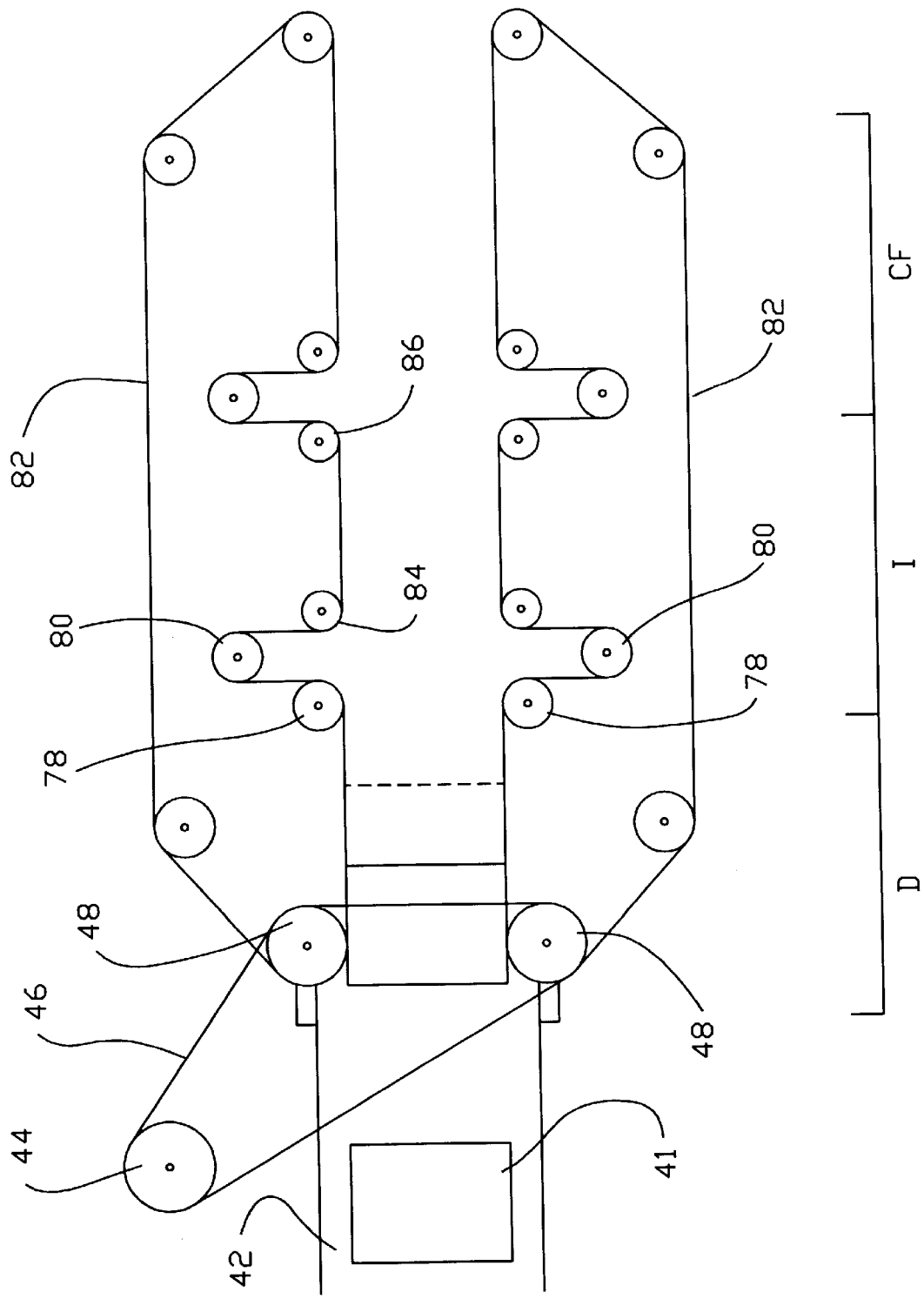
FIG. 3 is a top view of a preferred version of the singulator for use in the invention.

FIG. 3 illustrates a preferred embodiment of the singulator device which causes no abrupt contact between a moving pack and a stationary singulator.

The dual stacked packs 41 are carried to this singulator by a conveyor belt 42. Motor 44 drives first transmission belt 46 which synchronously turns capstans 48. Capstans 48 are, e.g. triple capstans, having a plurality of grooves for receiving belts.

Figure 4:
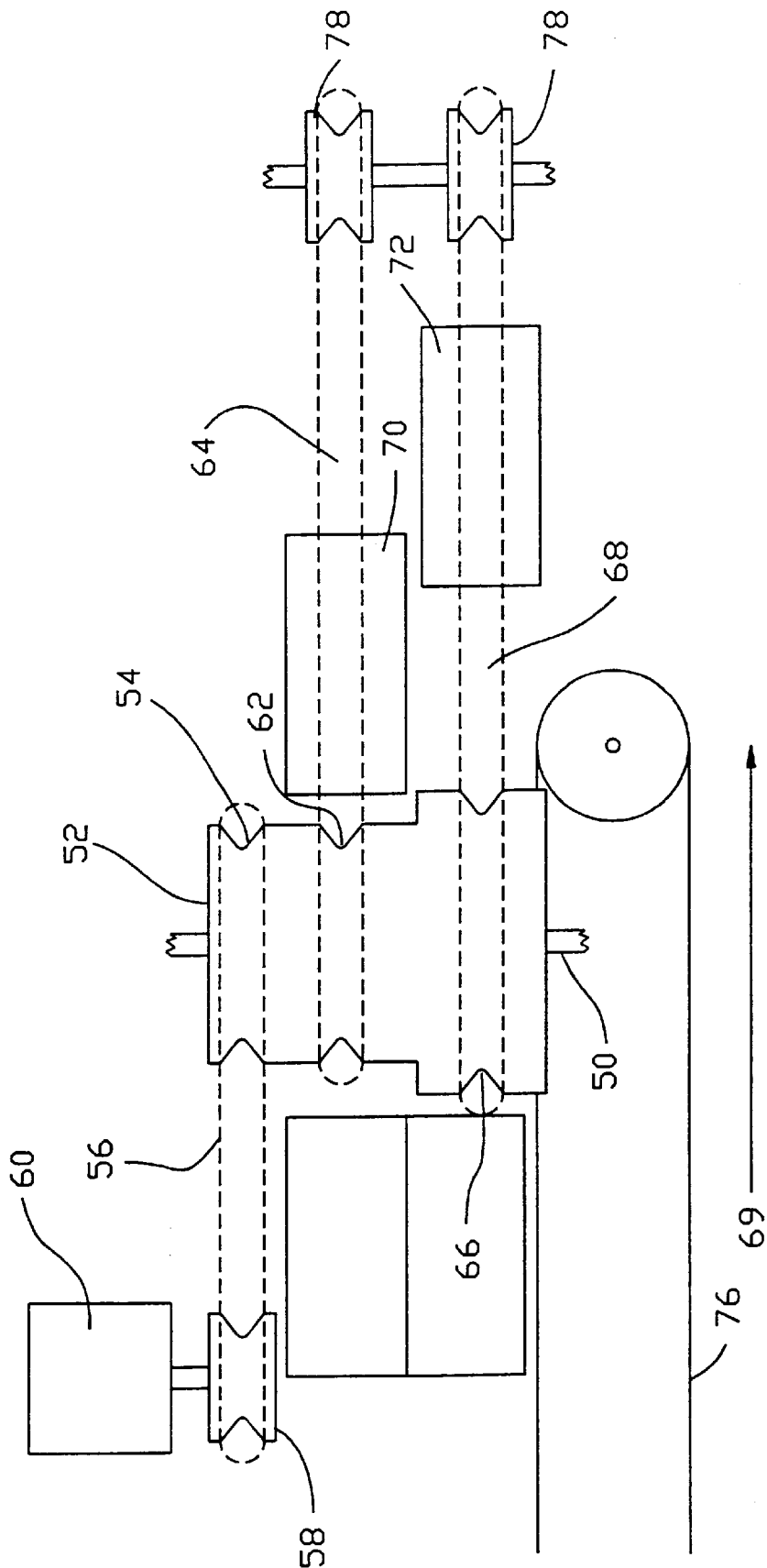
FIG. 4 is a side view of the displacement section of the preferred singulator of FIG. 3 for use in the present invention.

Referencing FIG. 4, which is a side view of the inventive capstan, it may be seen that axle 50 supports capstan 52. Axle and capstan are free to be displaced angularly about axle 50. Upper groove 54 receives first transmission belt 56 from motor capstan 58 which is powered by motor 60. Middle groove 62 receives upper conveying belt 64 and lower groove 66 receives lower conveying belt 68. The capstans may be angled slightly to compensate for their varying radius.

It may readily be seen from FIG. 4 that the lower groove has a larger diameter than upper groove. As the angular displacement of the upper and lower grooves is fixed in relation to each other, the overall speed of the lower belt is correspondingly higher than the upper belt. This may be adjusted by changing the diameter of the lower or upper grooves to suit the speed required as dictated by the sizes of the objects to be singulated.

As the packs travel in the direction of arrow 69, pack 70 travels slower than pack 72, and thus they are displaced relative to each other from original stack 74 brought into the singulator by flat conveyor belt 76.

The belts in the displacement section should be substantially parallel to each other to prevent collision between the packs. The displacement relative to each other of the packs should be substantially complete by the time capstans 78 are reached.

Figure 5:
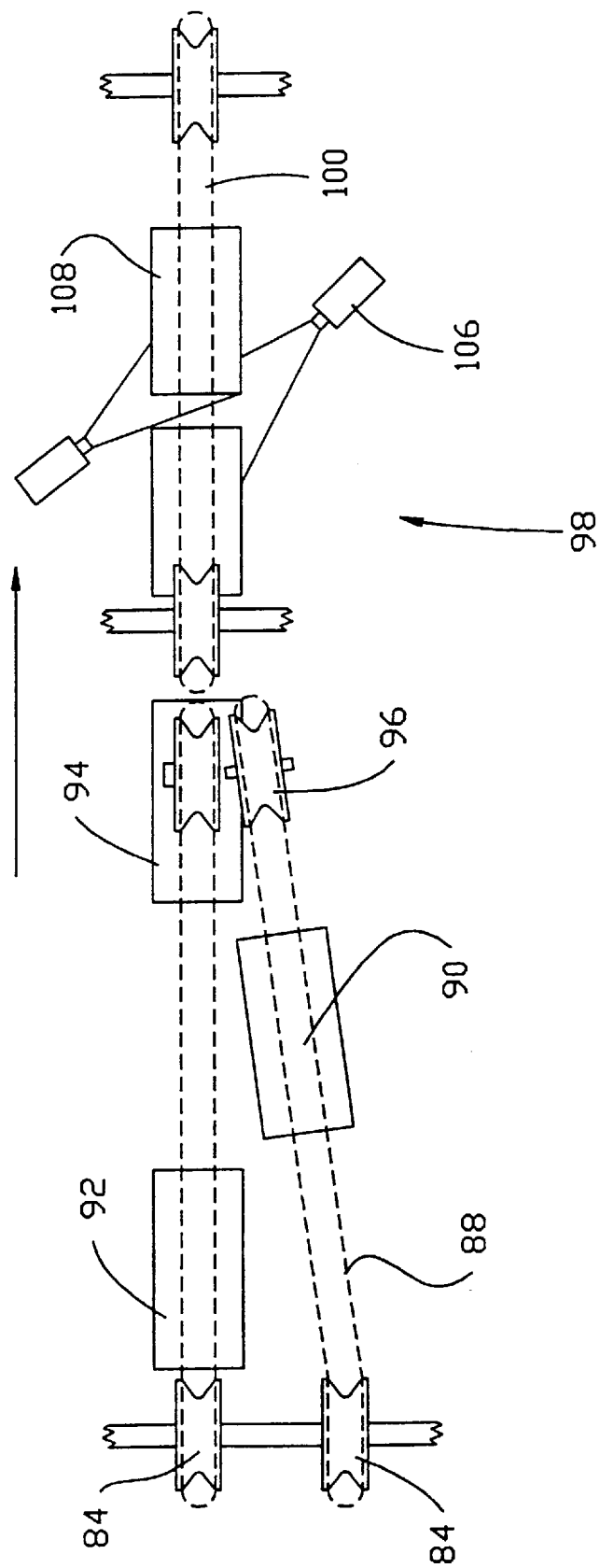
FIG. 5 is a side view of the integration and carry forward section of the preferred singulator for use in the present invention.

Returning to FIG. 3, it should be noted that the "displacement" section is section D between displacement section first capstan 48 and displacement section last capstans 78. Barrier capstans 80 are provided to separate the displacement section from the integration section to prevent collisions between pack. Lower belts 82 (having the higher speed) thus have different angles in different sections. Integration section "I" is between first integration capstans 84 and last integration capstans 86 and is illustrated in FIG. 5 in side view.

Integration section contains first integration capstans 84 which are coaxial. These capstans rotate independent of each other as they rotate at different speeds. Lower belt 88 moves at a higher speed, accelerating lower pack 90 into position between upper packs 92 and 94. Lower integration section end capstan 96 is angled slightly to match the angle of the lower belt. In a different embodiment, the lower integration section first capstan may also be angled to match the belt angle, but a sufficiently elastomeric belt may also be used to avoid the necessity of mounting a second axle. In integration section I, the belts need not necessarily converge.

After being integrated in single file, the packs are carried out by carry forward section (CF in FIG. 3) 98. Carry forward section belt 100 may be either a continuation of the upper or lower belt, but preferably it is the high speed lower belt to avoid collisions in high density situations. In the event that the belts of the integration section do not converge, two belts may be used and an upper belt may be used in conjunction with a lower belt to restack or rearrange the packs in single file, e.g., by dropping an upper pack onto or into line on a lower track.

Figure 6:
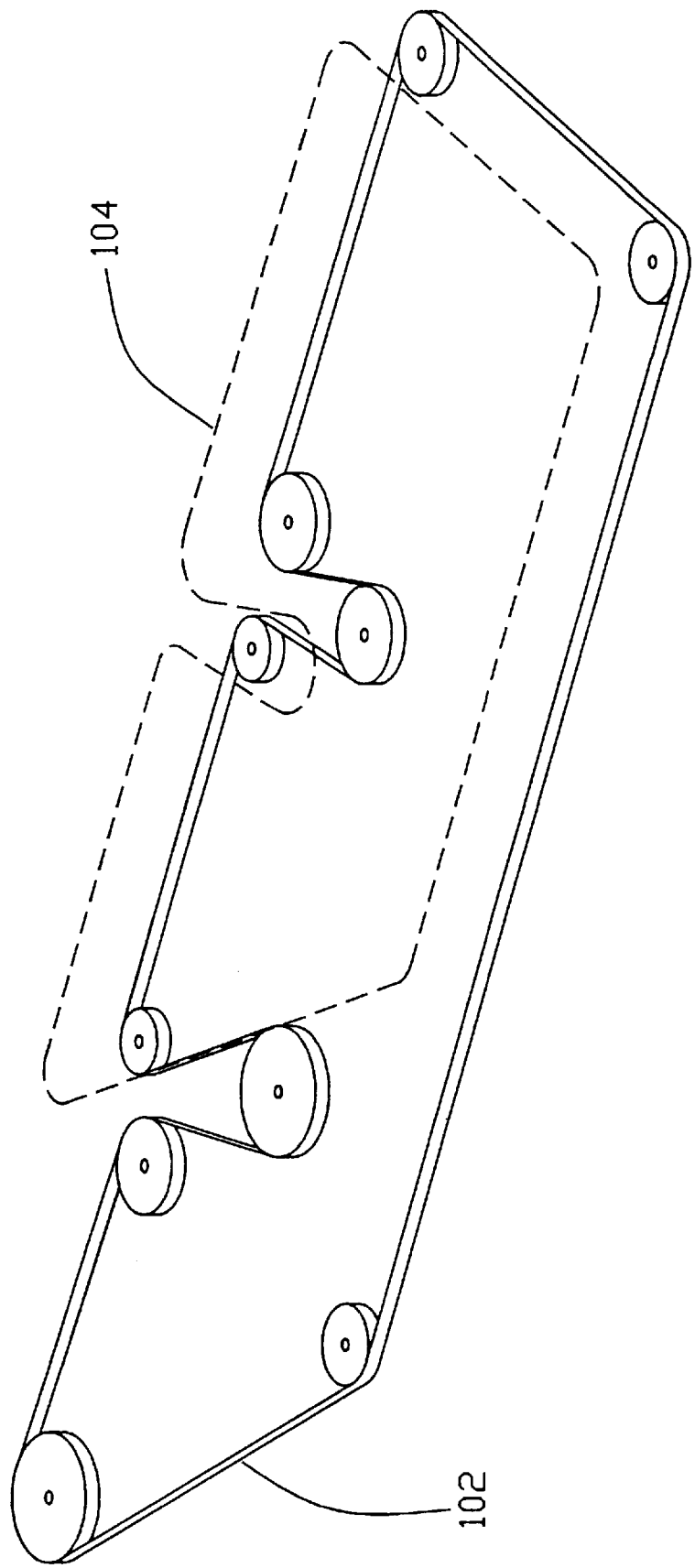
FIG. 6 is a diagrammatic representation of the layout of a particularly preferred high speed belt and pulley arrangement.

FIG. 6 is an illustration of one side of the singulating belt and pulley system. Lower belt 102 is shown with its pulley system while upper belt 104 is shown without its pulleys. It goes without saying that the mirror image section is placed on the other side of the path of travel of the packs to effect the singulating action and support the packs in their path of travel. Upper belt 104 is shown as a dotted line for ease of drawing. The inspection of the sides and faces of the pack may be effectuated by cameras 106 which are positioned so as to view both the sides and faces, or provided with reflectors which enable the lens to view both the sides and faces of the singulated packs 108.

Figure 7:
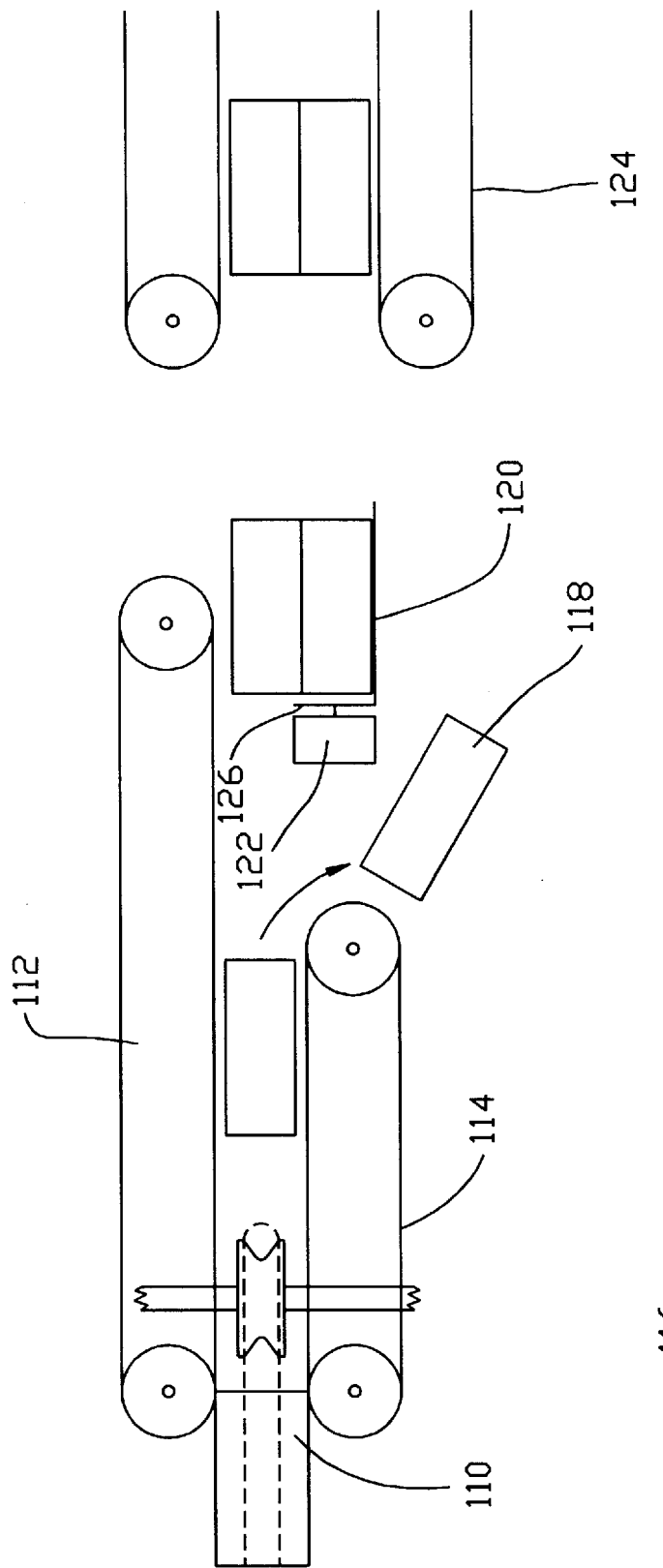
FIG. 7 is a side view of a restacker of the present invention.

FIG. 7 is a side view of a restacker which received the singulated packs from either singulator and replaces them in dual stack configuration. Pack 110 is carried forward by an upper belt 112 (which may be a vacuum belt) and a lower belt 114 in direction of travel 116. A rejected pack 118 falls when the vacuum is terminated from upper belt 112.

Alternatively, a jet of air may dislodge the pack which is determined to be defective. Acceptable packs are carried to the end of the belt where the vacuum is terminated by the drum sealing the holes of the belt. The packs then drop onto shelf 120. A sensor (not shown) detects the presence of two packs, and activates pusher device 122 which may be, e.g. a solenoid or pneumatic device. Pusher device 122 shoves the dual stacked pack forward into receiving belts 124 which carry the packs into the cartoner. Rear wall 126 of the shelf acts to align the stack into an evenly stacked arrangement during the forward pushing motion.

Figure 8:
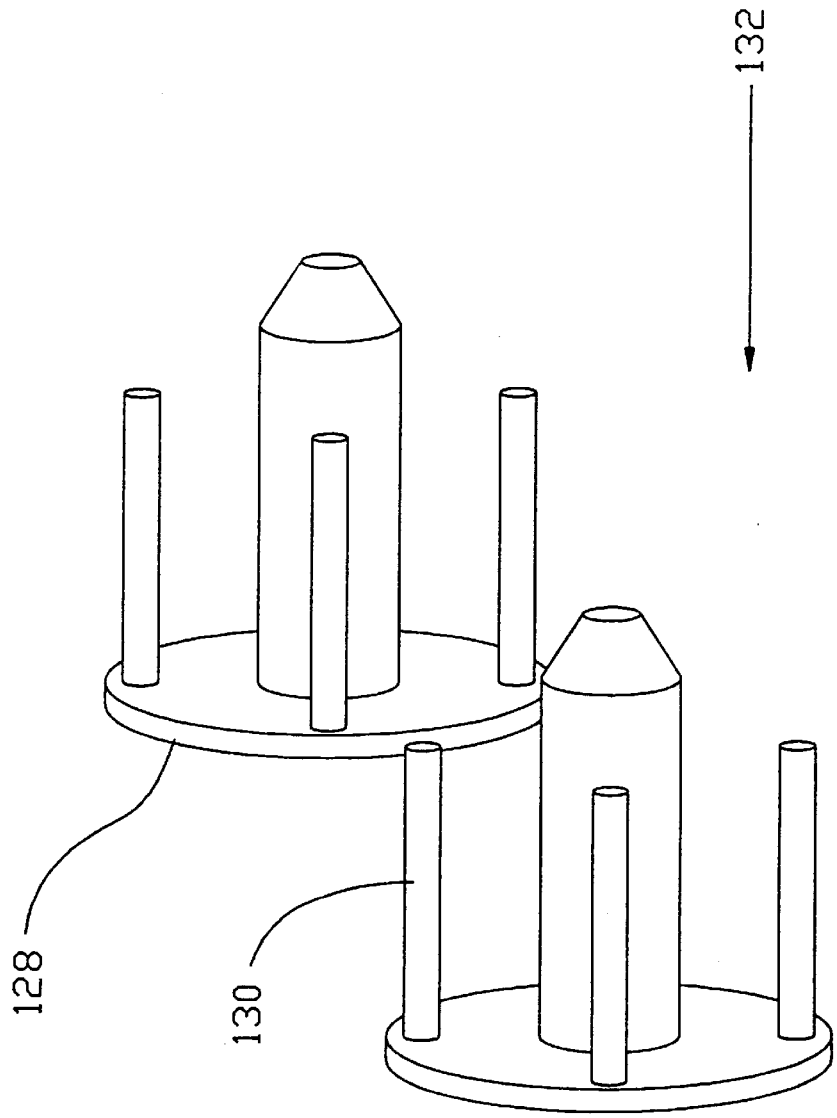
FIG. 8 is a perspective view of a reject discriminator device according to the present invention.

FIG. 8 illustrates in partial perspective view a preferred pass/reject discriminator apparatus for use in the present invention. Support wheels 128 rotate counter to each other and spindles 130 are located at locations around the wheel such that the distance between the tines equals the approximate depth of the packs. The packs approach the discriminator in the direction of arrow 132.

Figure 9:
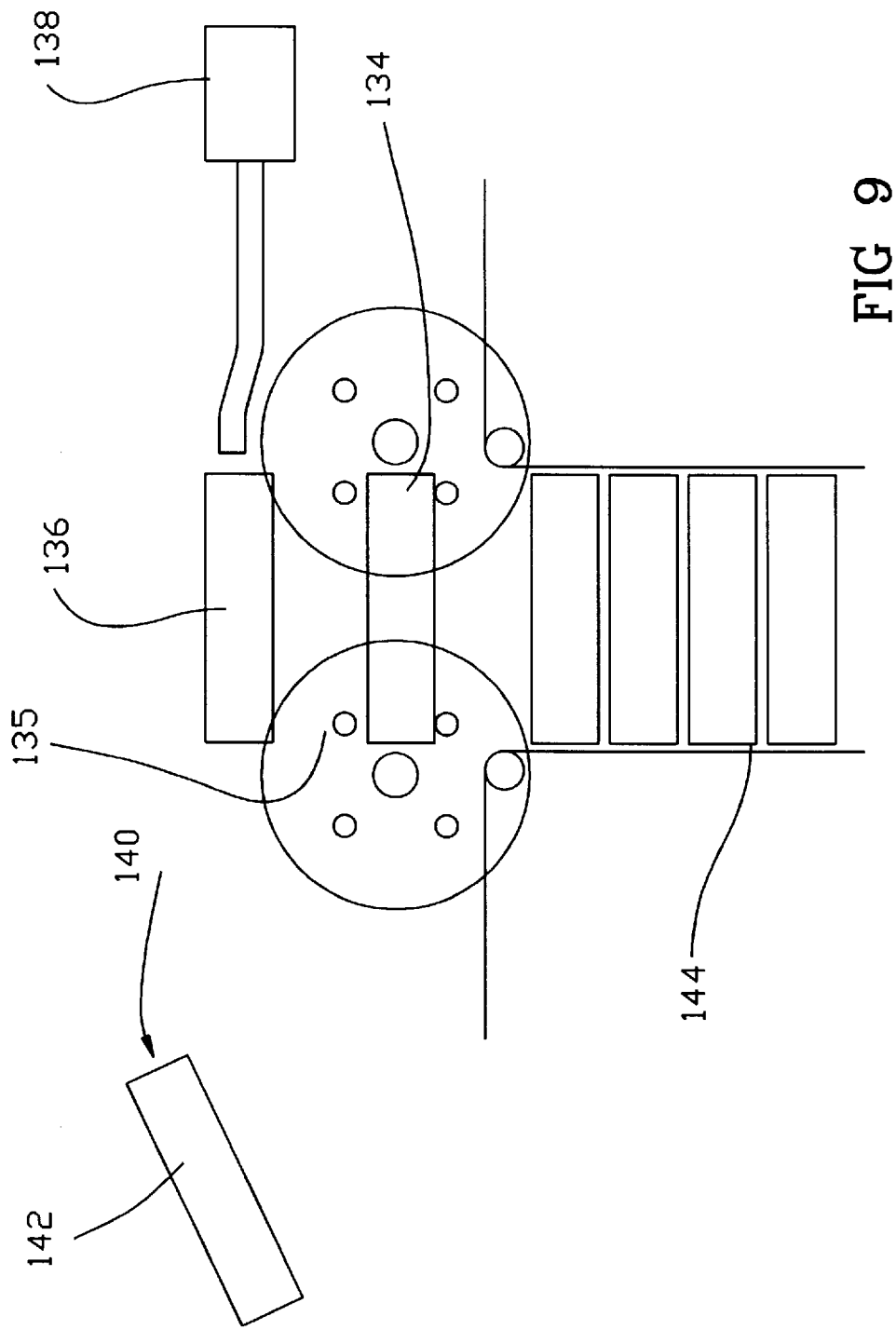
FIG. 9 is an end view of the discriminator device of FIG. 8 in conjunction with the elevator and a series of packs.

Turning now to FIG. 9, an end view of the discriminator, a pack 134 from the carry forward section of the inspection machine is inserted between the spindles 135 which are indexed to receive the pack. If the pack is rejected, the wheels rotate one-quarter turn (one fifth if there are five spindles, etc.) such that the pack is resting on top of one pair of spindles and the spindles which were above it are now removed to the side eg, pack 136. A blast of compressed air from air source 138 rejects the pack 142.

Figure 19:
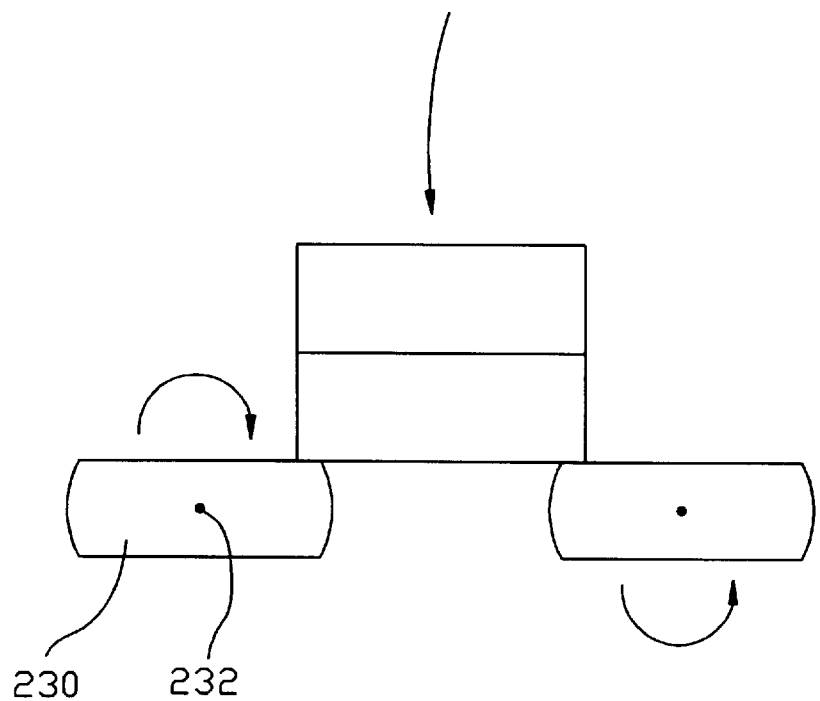
FIG. 19 is an end view of a restacker device.

Contrarily, when the pack is accepted, the spindles rotate counter such that the internal spindles are descending and the pack is released to descend between elevator belts 144 which synchronously move to lower the packs as they are received. Alternatively, the belts may be replaced by rotating paddles 230 as seen in FIG. 19. When a dual stack is created by the dropped pack, the paddles rotate about axis 232 to a vertical position allowing the two packs to drop onto a feed belt headed to the cartoner. The paddles then return to their horizontal configuration to await acceptable packs. The thickness of the paddles is selected such that packs will slip through them when in the vertical position, and will bar the packs when the paddles are in the horizontal position.

Figure 10:
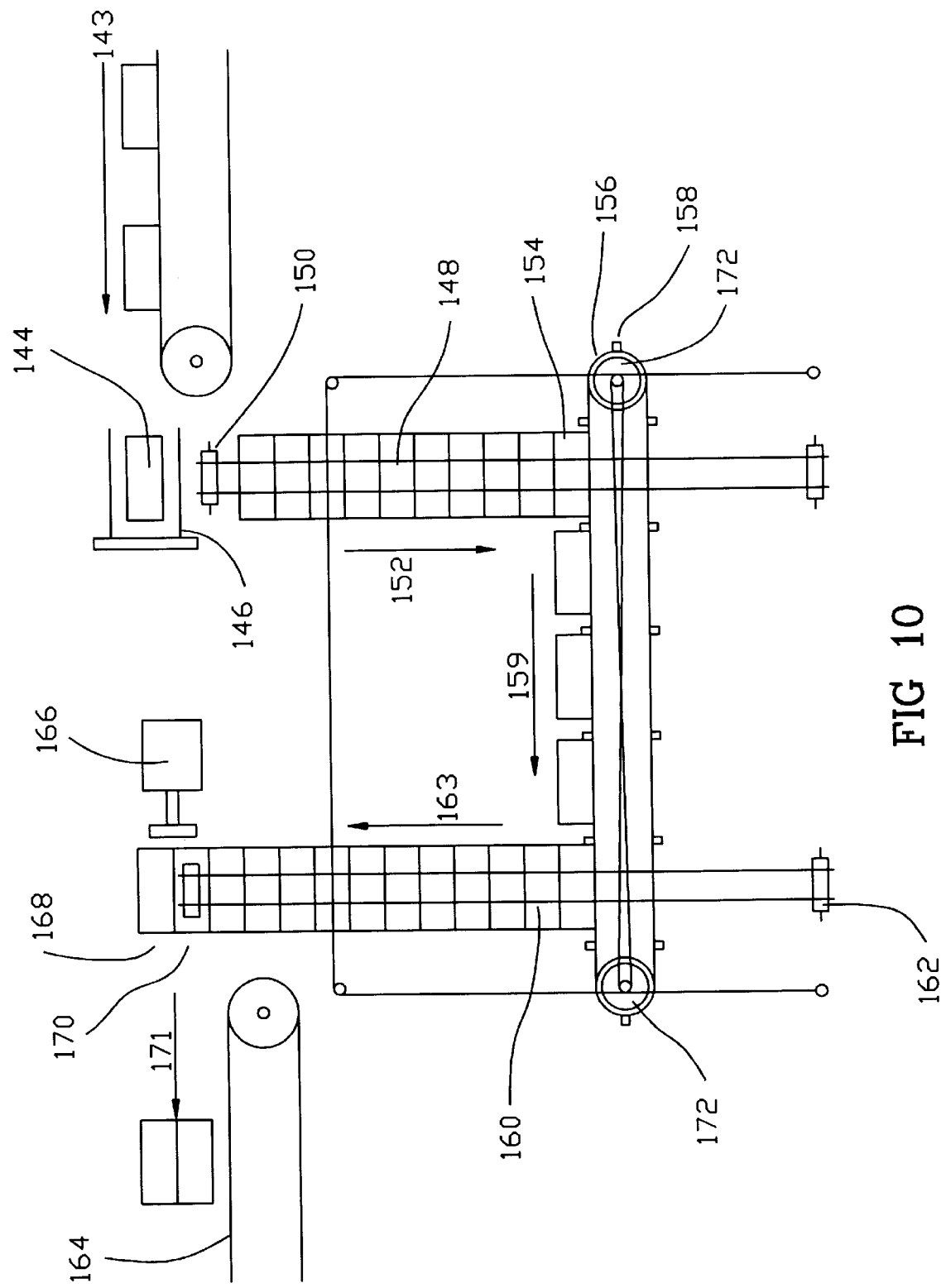
FIG. 10 is a side view of a stacker/buffer arrangement corresponding to the present invention.

FIG. 10 illustrates the entire discriminator/buffer section in operation. Packs moving in the direction of arrow 143 are placed in the position occupied by pack 144, on top of spindles 146, which rotate in either an inwardly upward direction or an inwardly downward direction. Accepted packs (the vast majority usually) are placed in a vertical elevator. The vertical elevator in this case is a pair of opposing bands 148 which are in a vertical direction and wrap around pulleys or wheels 150, and which grip the ends of the pack and bring it in a downward direction indicated by arrow 152. The vertical elevator is indexed to the number of packs in either side of the buffer.

The vertical elevator deposits the lowermost pack 154 on indexing belt 156. Indexing belt 156 has protrusions 158 which act to separate the packs and convey them in the direction of arrow 159 in an indexed manner to a second vertical elevator. The second vertical elevator likewise has dual opposing bands 160 which are stretched between pulleys 162. Both elevators are powered by an indexing motor. The elevator raises the packs in the direction of arrow 163 by gripping them between the opposing pairs of bands. It should be noted that the mirror image side of these bands may not be seen in FIG. 10. When a sensor detects two packs above the level of carton input belt 164, and a demand signal is received, actuator 166 presses against the top two packs 168, 170, and they are moved on to the belt, where they travel in the direction of arrow 171.

Figure 11:
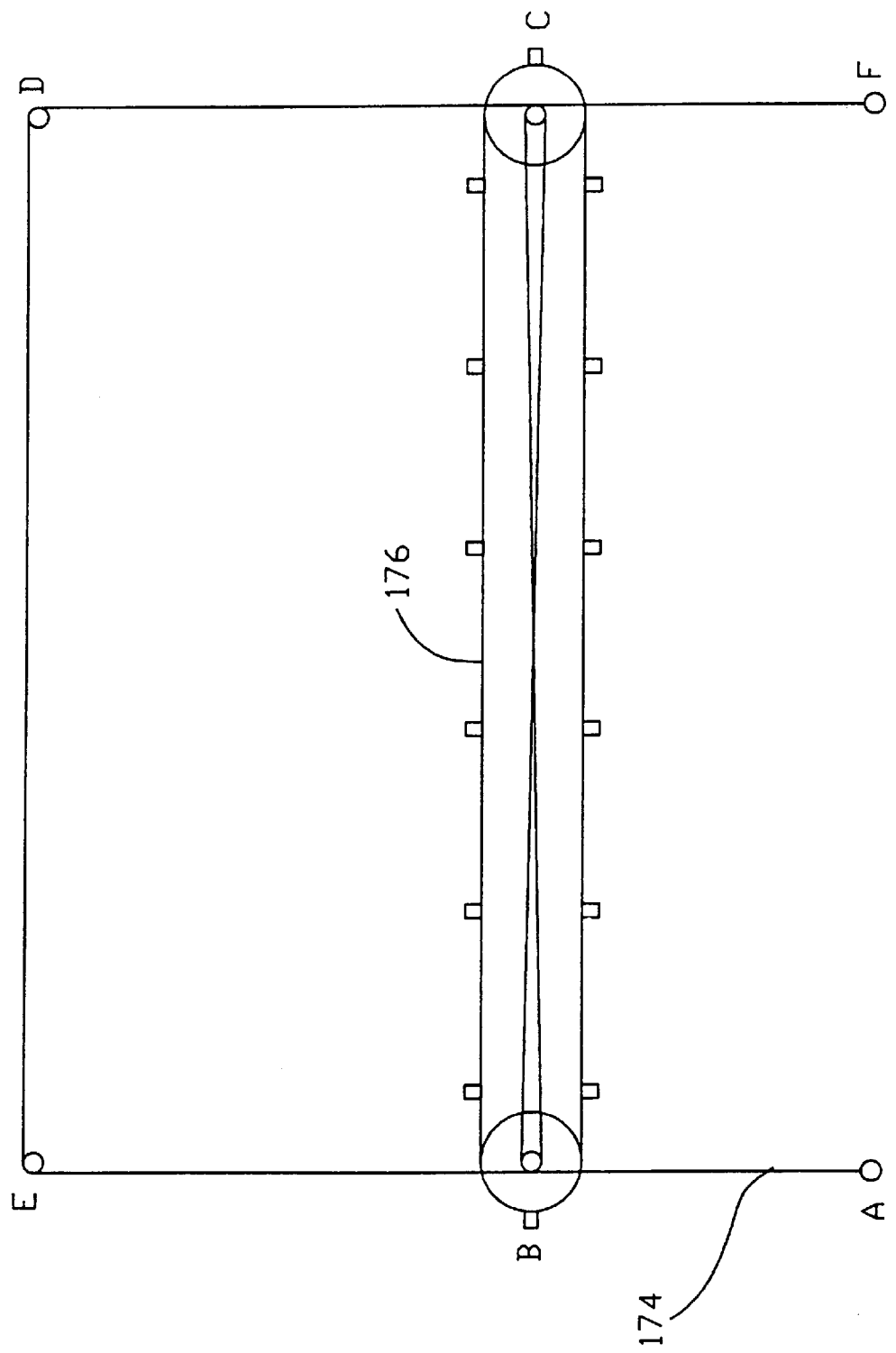
FIG. 11 is a side view of a vertically movable joining belt.

It should also be noted that the indexing belt 156 is suspended between rollers 172 which are part of a leveled elevator system capable of moving upwardly and downwardly while remaining level; thus acting as a buffer. Buffers are necessary in high speed machines when supply temporarily exceeds demand, and vice versa to keep production from being halted. FIG. 11 illustrates an exemplary pulley system.

Continuous support cable 174 originates at fixed point A, extends upwardly over movable point B, which is either free to rotate, or the cable may slip over freely to provide free cable motion. Point B is also free to move up or down, but not from side to side. The cable then extends to go underneath point C, which is also free to move up or down, but not side to side. The cable then extends upwardly to fixed point D, across to fixed point E, returning to point B and going under point B to point C. The cable then goes over point C, and ends at fixed point F. This allows the indexing belt 176 to freely move up and down while remaining horizontal.

It should be noted that if one desires to eliminate the buffer section, the restacker of FIG. 19 simply and efficiently restacks two packs in a dual relation.

Additional preferred arrangements within the scope of this disclosure are illustrated in FIGS. 12–18 which are discussed in some greater detail below.

Figure 12:
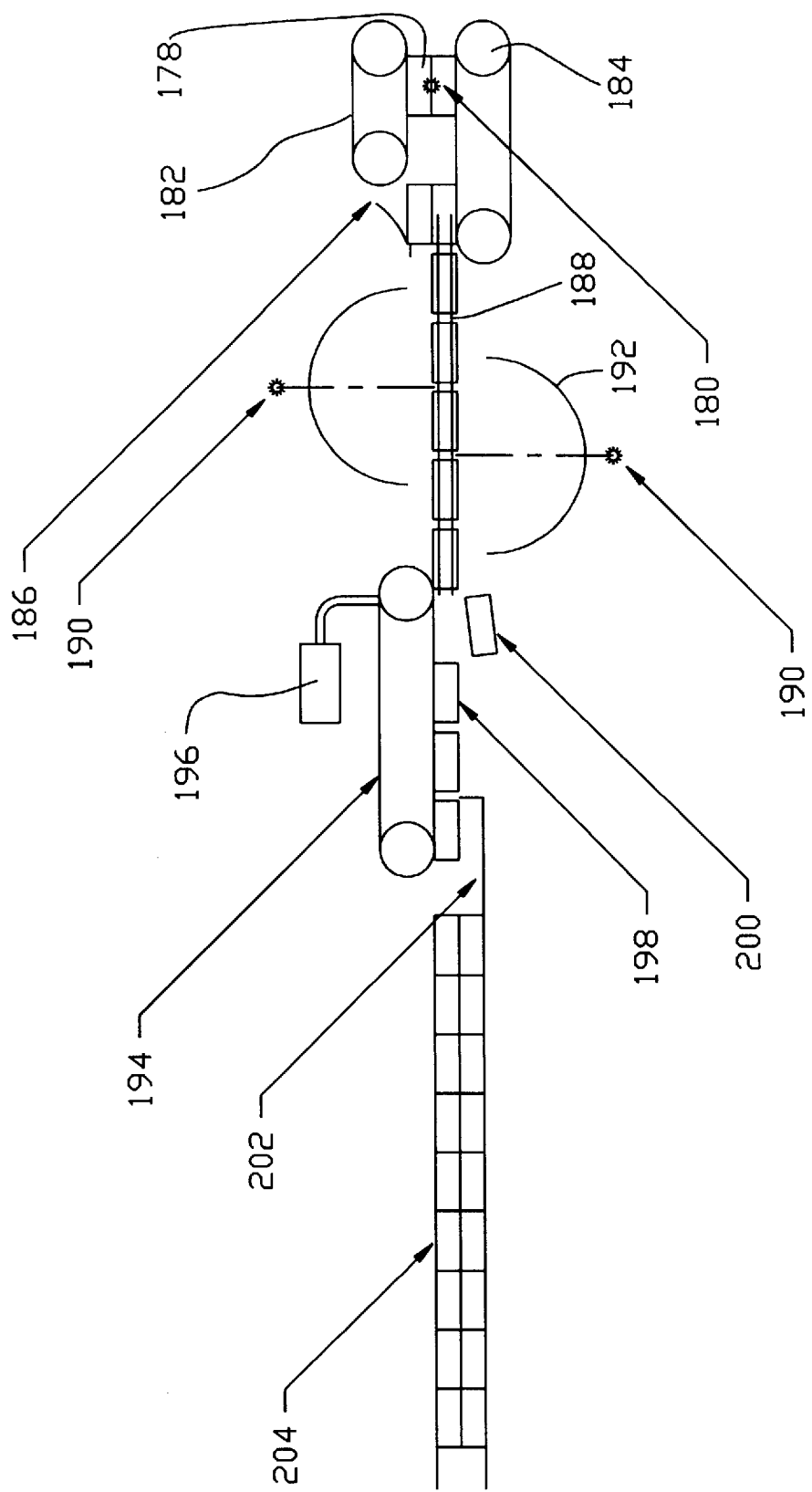
FIG. 12 is a side view of a preferred arrangement of the present invention.

FIG. 12 illustrates the pathway that packages 178 follow in a version of the complete inspection portion of an apparatus according to the present invention according to FIG. 1. Packs 178 are presented in a double stacked arrangement, and travel in the direction illustrated by the large arrow. The top and/or bottom ends of the packs are inspected by a top/bottom camera or pair of cameras 180 and may employ a product appearance inspection method as described in U.S. Pat. No. 5,537,670, which is incorporated herein in its entirety by reference. The packs are moved by opposing belts 182 mounted on rollers 184. The upper pack encounters singulator 186, which may be an arcuate surface as illustrated, or another shape which blocks the path of travel of the upper pack, knocking it back behind the lower pack.

The packs then are carried by side belts 188 which frictionally engage the top and bottom of the packs and carry them forward past cameras 190 which inspect the front and back of the packs. Additional cameras (not shown) can be angled to inspect the sides, or enclosures 192 can be used to reflect images of the sides of the packs, provide illumination, or otherwise enhance the inspection process by excluding ambient light.

The packs then travel from the side belts to a vacuum belt 194 which is connected to vacuum 196. Inspected and accepted packs 198 are held to the belt by the vacuum if passed, and if rejected, the flow of air to the area which corresponds to the rejected pack is interrupted, for example by providing a movable sleeve which closes the air holes which permeate the belt. Rejected packs 200 then fall under the influence of gravity to a reject bin.

Accepted packs travel to the end of the vacuum belt where they fall to a pack grabber 202. After two packs fall into the grabber, the packs are propelled to a high-low buffer 204.

Figure 13:
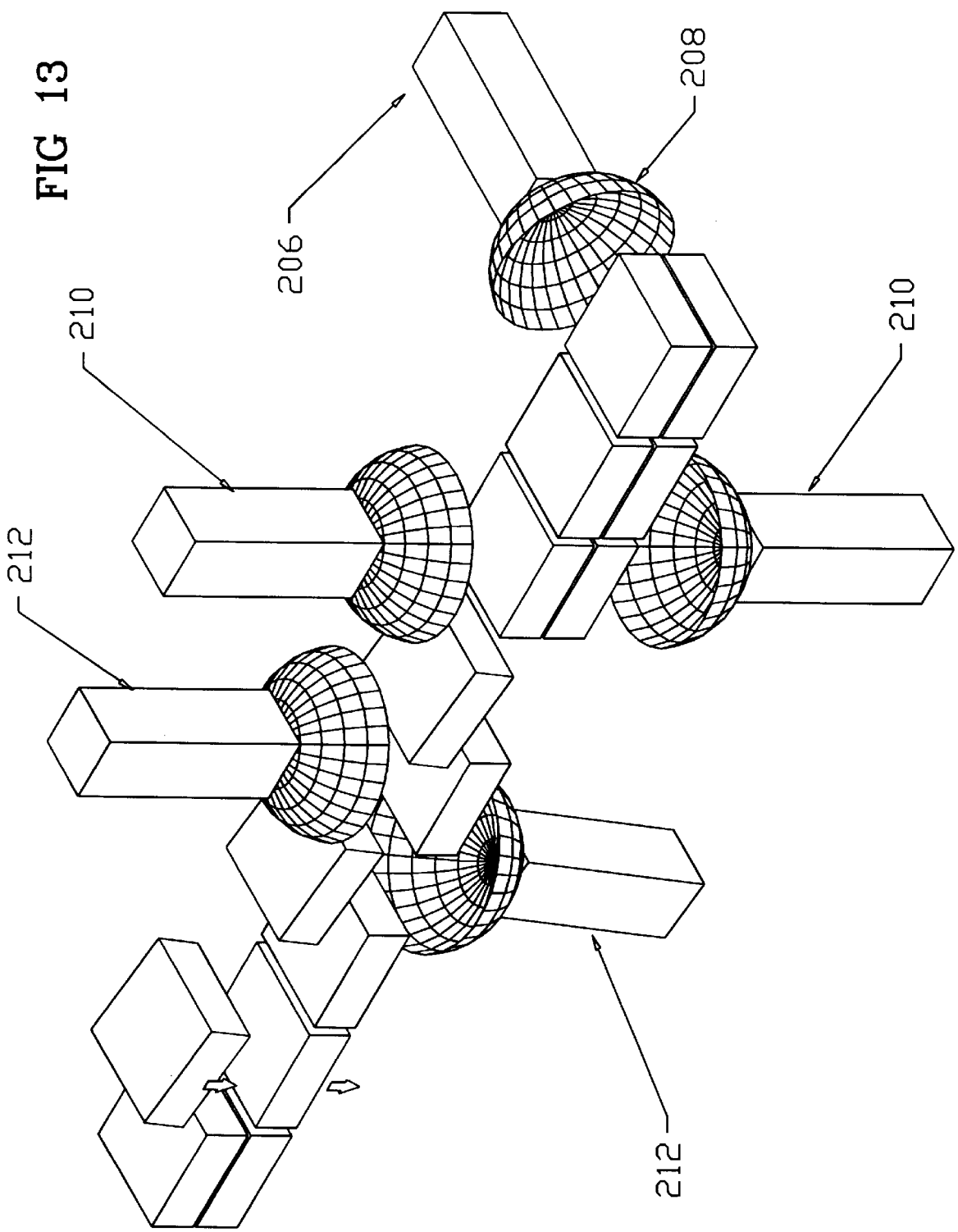
FIG. 13 is a perspective view of the inspection system of a preferred embodiment of the present invention.

FIG. 13 shows in detail a preferred camera arrangement for use in the embodiment of FIGS. 2–6. Camera 206 inspects the top or bottom, and a corresponding camera (not shown for clarity, but essentially corresponding to the camera shown) inspects the other side. Hood/reflective element 208 allows a greater angle of view for inspection and excludes ambient light. Side inspection cameras 210 inspect the front and rear panels of the double stacked packs. It should be noted that the terms "front", "rear", "top", "bottom" and "side" can be used interchangeably depending on the orientation of the pack. The interior front and back panels of the double stacked packs are then inspected by cameras 212 and 214 as the dual belt arrangement (FIG. 4, reference numeral 64) separates the packs.

Figure 14:
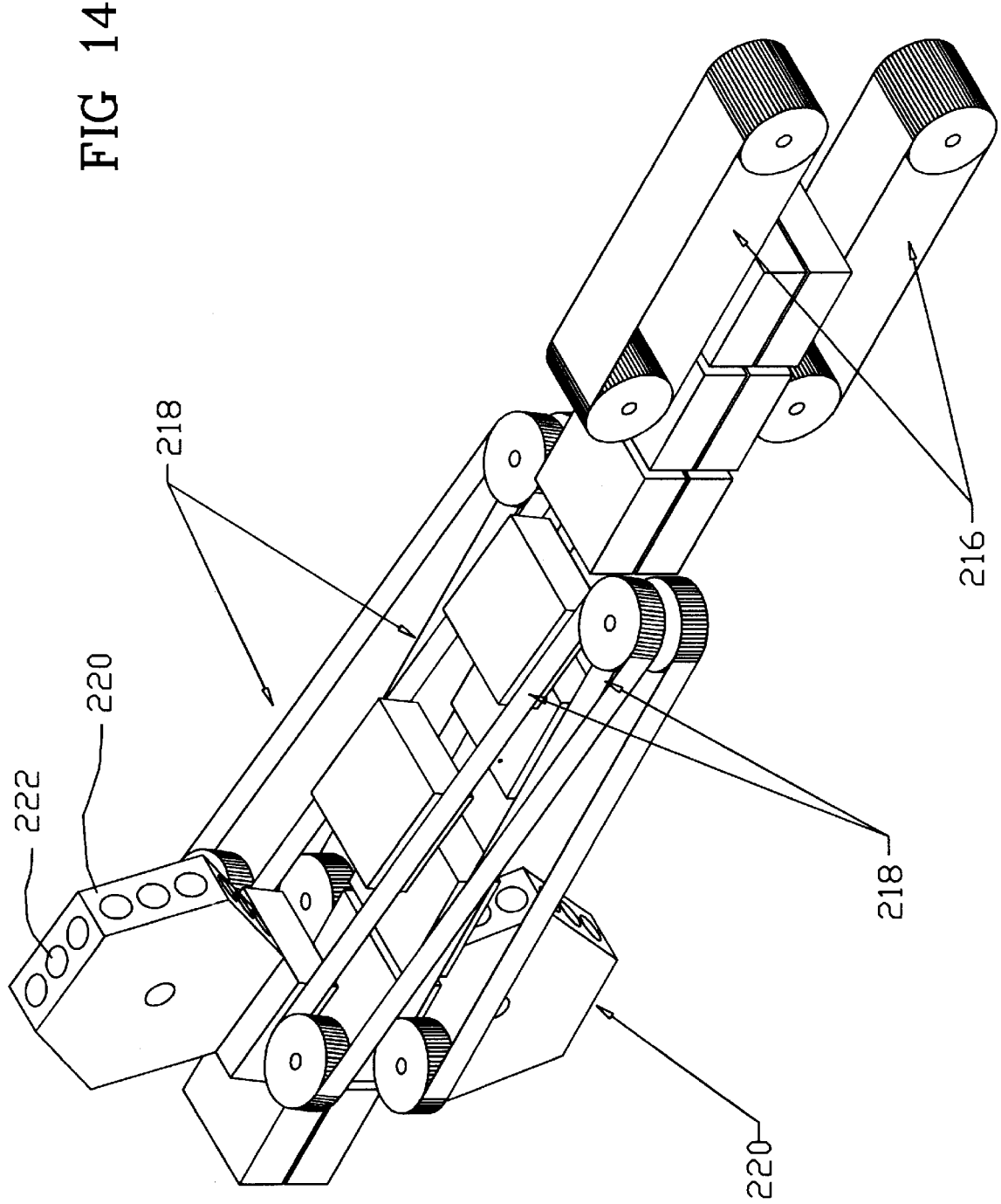
FIG. 14 is a perspective view of a preferred transport/reject arrangement according to the present invention.

In the event a flaw or defect is discovered in the packaging, a vacuum reject remover, for example as illustrated in FIG. 14, for use in a system as shown in FIG. 13, can remove the defective pack. Feed-in belts 216 move the packs through the inspection apparatus. Incrementing belts 218 move the packs into a spaced apart relationship, with gaps between the packs. The packs move in different separated planes, enabling the cameras to view between packs to see the uncovered front or back.

Vacuum reject removers 220 are controlled by a control unit (not shown) which received input from the inspection devices. If a flaw or poor image is recorded, the controller then identifies the location of the pack (upper or lower track), and activates the vacuum unit (not shown) at the appropriate time to cause the pack to adhere to the circumference of the vacuum reject remover through suction applied through orifices 222.

Figure 15:
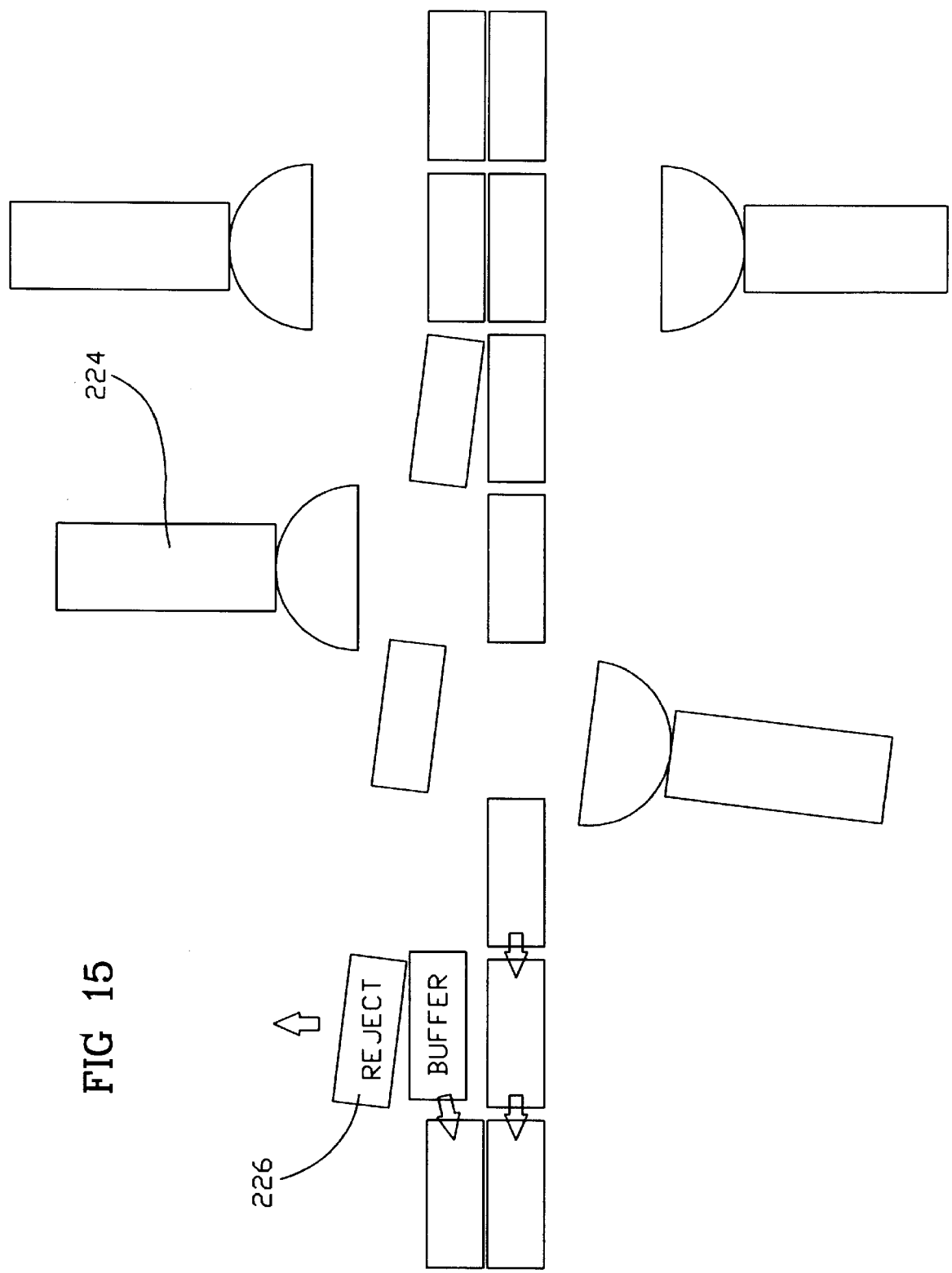
FIG. 15 is a side view of the pack/inspection arrangement with a reject in the top track and buffer full.
Figure 16:
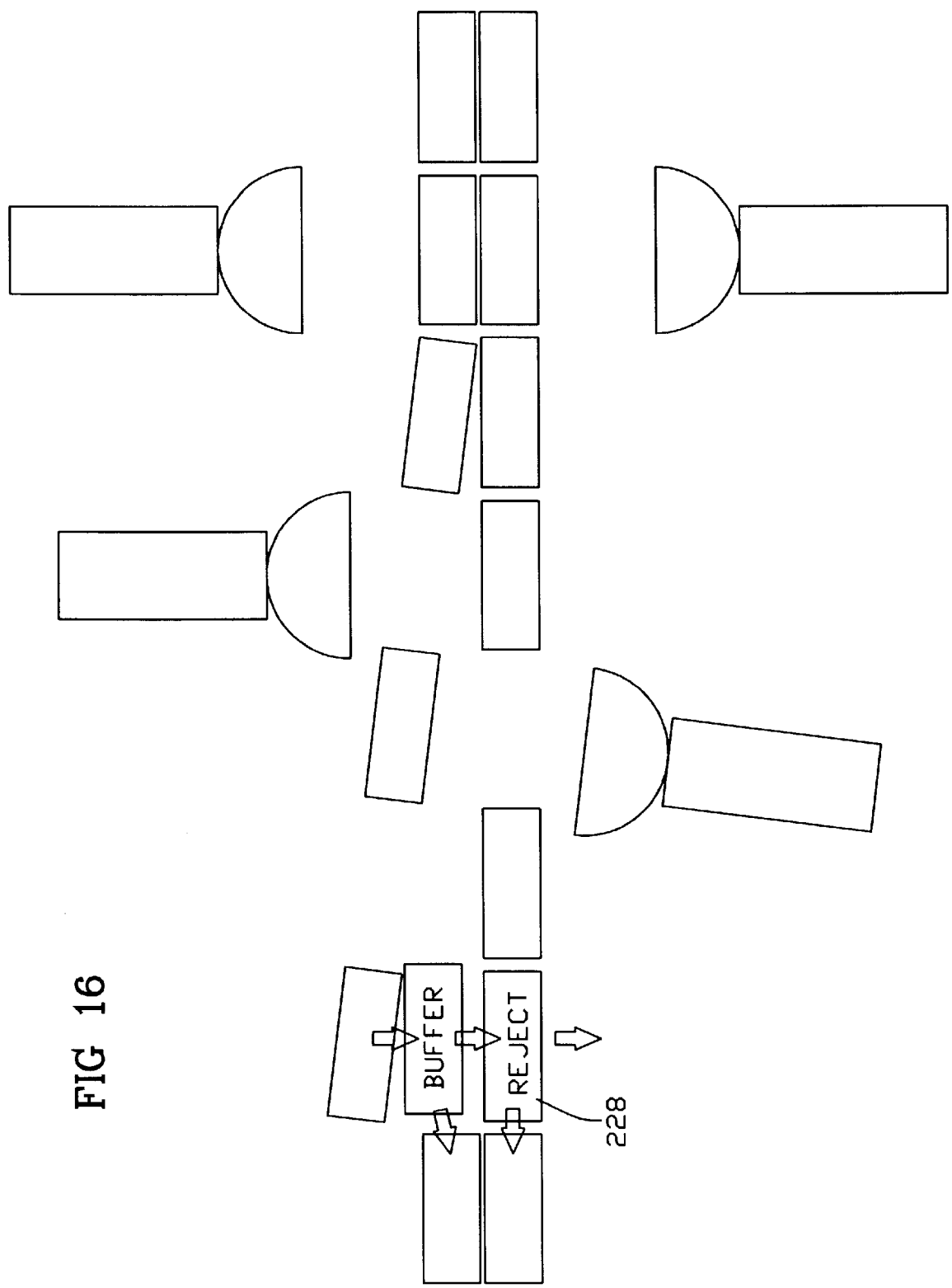
FIG. 16 is a side view of the pack/inspection arrangement with a reject in the bottom track and buffer full.
Figure 17:
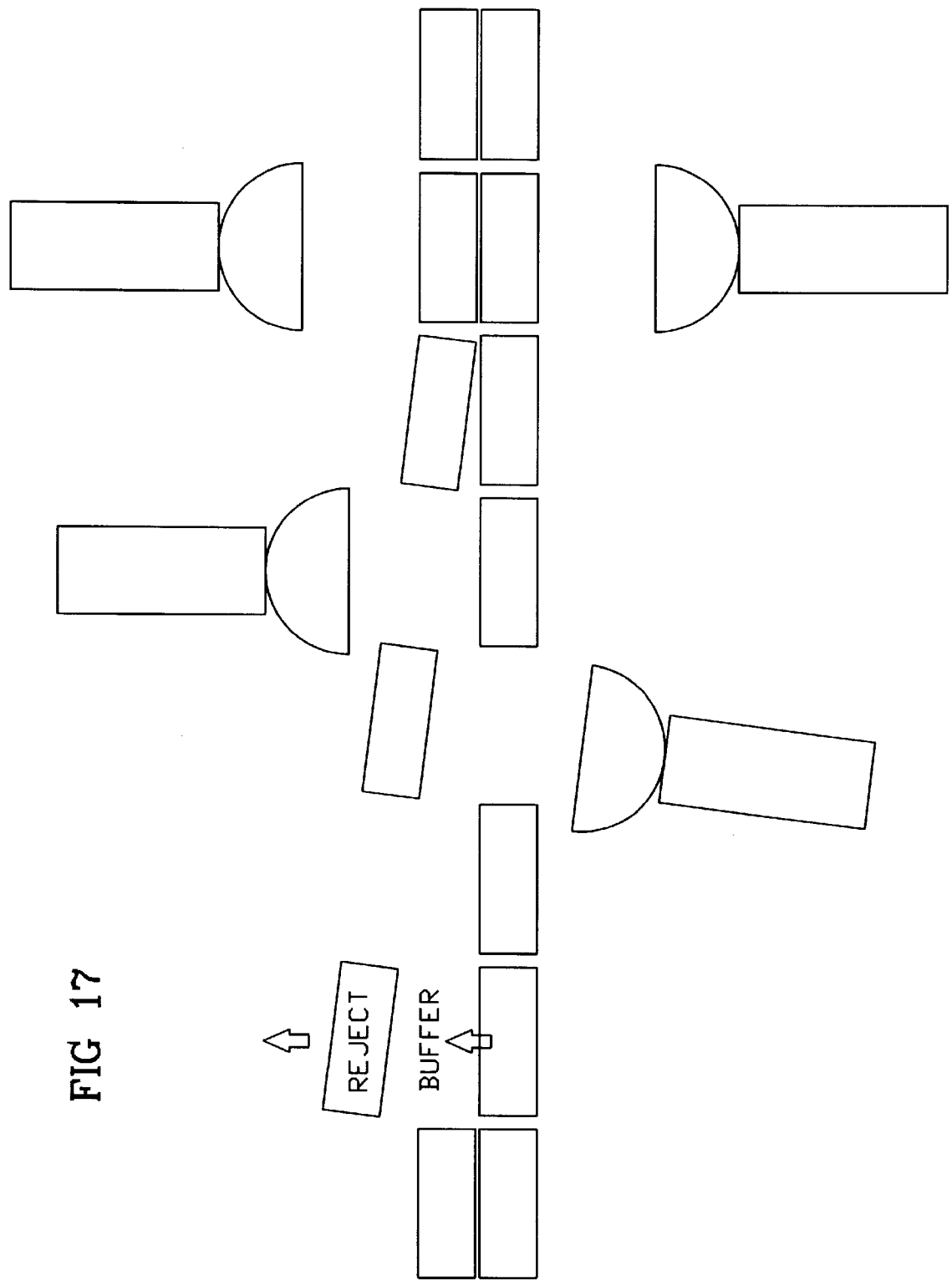
FIG. 17 is a side view of the pack/inspection arrangement with a reject in the top track and buffer empty.
Figure 18:
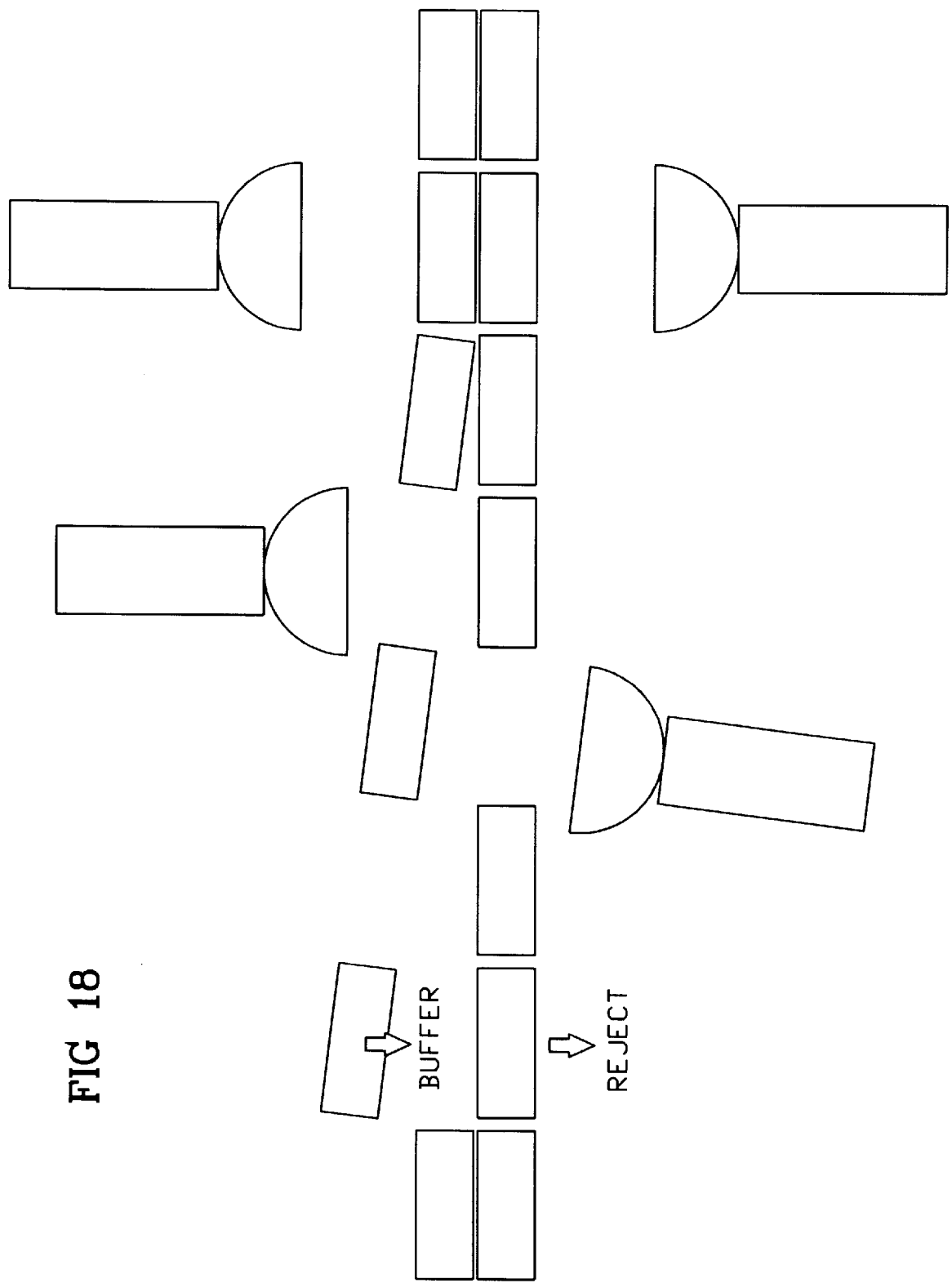
FIG. 18 is a side view of the pack/inspection arrangement with a reject in the bottom track and buffer empty.

FIG. 15 is a side view of FIG. 14 illustrating the path of the packs past the cameras 224. A rejected pack 226 is removed from the upper track of the buffer. FIG. 16 illustrates the flow of packs in an embodiment for removing and replacing defective packs. The bottom track contains a reject 228 which is removed. The upper pack falls to the lower track and the upper pack is replaced from a storage of good packs. FIG. 17 illustrates a reject in the top track with the buffer empty, while FIG. 18 illustrates a reject in the lower track with the buffer empty.

Maintaining a continuous uninterrupted flow of inspected product enables higher speeds to be maintained, and correspondingly increases productivity and efficiency.

Having described the invention as above, we claim:

1. An apparatus for the inspection of uniform packages of goods which move along a path in stacked relation, said stacks being formed from a plurality of packages having faces, at least some of said faces being hidden by the stacked relation of the packages, said apparatus comprising:
   a destacking device for removing the stacked packages from stacked relation,
   an inspection device for inspecting the single packages, and
   a restacking device which returns the inspected packages to a stacked relation, wherein the restacking device comprises a shelf which receives the single packages in a stacked relation and the shelf is formed with a vertical wall as high as the initial stack of packages, and the vertical wall pushes the stack to deliver it out of the apparatus.

2. An apparatus for the inspection of uniform packages of goods which move along a path in stacked relation, said stacks being formed from a plurality of packages having faces, at least some of said faces being hidden by the stacked relation of the packages, said apparatus comprising:
   a destacking device for removing the stacked packages from stacked relation,
   an inspection device for inspecting the single packages, and
   a restacking device having
      a first elevator for receiving inspected packages and transporting them in a first direction;
      a joining belt for receiving the transported packages from the first elevator and transporting them in a second direction, and
      a second elevator which receives the packages transported in the second direction, and transports the packages in a third direction.

3. An apparatus as claimed in claim 2, wherein the elevators are substantially vertical and the joining belt is substantially horizontal.

4. An apparatus as claimed in claim 3, wherein the joining belt is formed with indexing grooves or protrusions, and the joining belt is indexed to regulate the flow of packages.

5. An apparatus as claimed in claim 2, wherein the joining belt is free to move in a vertical plane.

6. An apparatus for the inspection of uniform packages of goods which move along a path in stacked relation, said stacks being formed from a plurality of packages having faces, at least some of said faces being hidden by the stacked relation of the packages, said apparatus comprising:
   a destacking device for removing the stacked packages from stacked relation, the destacking device having a plurality of endless belts mounted on a capstan having a varied diameter,
   an inspection device for inspecting the single packages, and
   a restacking support device comprising a pair of rotating paddles.

7. An apparatus for the inspection of goods and regulation of flow of packages of goods, said packages being presented in a stacked relation, comprising:
   an input region for receiving the packages of goods,
   a singulator for stacked packages and separating the stacked packages into a single line of packages, said singulator comprising at least two belts which converge in part, one of said belts operating at a different speed from the other,
   an inspection device for conducting an inspection on the packages,
   a restacking device, said restacking device comprising
      a discriminator for accepting or rejecting inspected packages,
      a first vertical elevator for receiving accepted packages and transporting them in a first vertical direction,
      a joining belt for receiving said packages which have been transported in the first direction and transporting the packages in a second direction which intersects said first direction,
      a second vertical elevator for receiving said packages which have been transported in the second direction, which elevator forms a stack of packages and delivers them in a third direction, and
      an output device which ejects a stack of packages from the second vertical elevator.

8. An apparatus as claimed in claim 7, wherein the joining belt is vertically adjustable and is controlled by a control device to regulate the flow of packages through the apparatus.

9. An apparatus as claimed in claim 7, wherein the output device comprises an actuator with a flat surface, said flat surface contacting a number of packages corresponding to the stack of packages and ejecting the newly-formed stack from the vertical elevator.

10. An apparatus as claimed in claim 7, wherein the inspection device comprises an optical camera; an X-ray device; a microwave device; or other inspection device for probing the interior or exterior of the package.

11. An apparatus for the handling of packages of goods undergoing inspection, said packages being presented for inspection in a stacked relation and being packaged together in stacked relation, comprising:

an input region for receiving the stacked packages of goods, a singulator for stacked packages and separating the stacked packages into a single line of packages, said singulator comprising at least two belts which remove the stacked packages from their stacked relationship, an inspection device for conducting an inspection on the packages while they are held in an unstacked relation, a discriminator device for accepting or rejecting inspected packages, and a restacking device, said restacking device comprising a support device located below the discriminator device and having a pair of rotating paddles which are controlled by a controller and a sensor which determines when a stack is formed, and controls the rotation of the paddles to drop the packages as a formed stack.

12. An apparatus for the inspection of uniform packages of goods which move along a path in stacked relation, said stacks being formed from a plurality of packages having faces and sides, at least some of said faces being hidden by the stacked relation of the packages, said apparatus comprising:

a destacking device having a plurality of endless belts moving in essentially parallel direction, said belts mounted on a capstan having a varied diameter, said belts removing the stacked packages from stacked relation by gripping the sides of the packages and transporting them at different speeds, an inspection device for inspecting the single packages, and a restacking device which returns the inspected packages to a stacked relation.

13. An apparatus as claimed in claim 12, wherein the belts are formed from an elastomeric material.

14. An apparatus as claimed in claim 12, wherein the restacking device comprises a shelf which receives the single packages in a stacked relation.

15. An apparatus as claimed in claim 12, wherein the restacking device comprises a support device for receiving and supporting packages.

16. An apparatus as claimed in claim 15, wherein the support device is a pair of rotating paddles.

\* \* \* \* \*